United States Patent
Chen et al.

(10) Patent No.: US 12,146,633 B1
(45) Date of Patent: Nov. 19, 2024

(54) VEHICLE LAMP SYSTEM WITH FRUSTUM REFLECTOR AND LIGHTING METHOD USING FRUSTUM REFLECTOR

(71) Applicant: Ford Global Technologies, LLC, Dearborn, MI (US)

(72) Inventors: Linsheng Chen, Novi, MI (US); Arun Kumar, Farmington Hills, MI (US); John Teodecki, Grosse Pointe Farms, MI (US); Michael Bryan VanBelle, Canton, MI (US); Udayakumar Ramasami, Novi, MI (US); Gary Henige, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/521,064

(22) Filed: Nov. 28, 2023

(51) Int. Cl.
  *F21S 43/31*   (2018.01)
  *B60Q 1/28*    (2006.01)
  *B60Q 1/32*    (2006.01)
  *F21W 103/55*  (2018.01)

(52) U.S. Cl.
  CPC ............... *F21S 43/31* (2018.01); *B60Q 1/28* (2013.01); *B60Q 1/32* (2013.01); *F21W 2103/55* (2018.01)

(58) Field of Classification Search
  CPC .. F21S 43/31; B60Q 1/28; B60Q 1/32; F21W 2103/55
  USPC .......................................... 362/516, 543–545
  See application file for complete search history.

(56) References Cited

U.S. PATENT DOCUMENTS

| | | | |
|---|---|---|---|
| 8,858,036 B2 | 10/2014 | Guercio et al. | |
| 10,076,005 B2 | 9/2018 | Childers | |
| 10,279,738 B1 | 5/2019 | Chen et al. | |
| 10,559,797 B2 | 2/2020 | Sweney et al. | |
| 11,624,490 B2 * | 4/2023 | Muegge ................ | F21S 43/243 362/511 |
| 2013/0155671 A1 * | 6/2013 | Kurt ......................... | F21V 5/04 362/231 |

FOREIGN PATENT DOCUMENTS

JP            2022053395 A       4/2022

* cited by examiner

*Primary Examiner* — Laura K Tso
(74) *Attorney, Agent, or Firm* — Vichit Chea; Carlson, Gaskey & Olds, P.C.

(57) ABSTRACT

A vehicle lamp assembly includes a light source that emits light, a side marker lamp having a lens, and a frustum reflector that guides light from the light source to the lens of the side marker lamp. A vehicle lighting method includes emitting light from a light source into a frustum reflector, redirecting the light within the frustum reflector, and illuminating a side marker lamp using the light redirected within the frustum reflector.

18 Claims, 4 Drawing Sheets

VEHICLE LAMP SYSTEM WITH FRUSTUM REFLECTOR AND LIGHTING METHOD USING FRUSTUM REFLECTOR

TECHNICAL FIELD

This disclosure relates generally to a lamp system for a vehicle and, more particularly, to a lamp system incorporating a frustum reflector.

BACKGROUND

Vehicles include various types of lamp assemblies. The lamp assemblies are illuminated when light from a light source moves through a lens. Lamp assemblies can include headlamps, taillamps, side marker lamps, etc. Side marker lamps can help to identify a vehicle's presence, position, and direction of travel, particularly when the vehicle is viewed from an oblique angle.

SUMMARY

In some aspects, the techniques described herein relate to a vehicle lamp system, including: a light source that emits light; a lens of a vehicle lamp; and a frustum reflector that guides light from the light source to the lens of the vehicle lamp.

In some aspects, the techniques described herein relate to a vehicle lamp system, wherein the vehicle lamp is a side marker lamp such that the lens is a side marker lamp lens.

In some aspects, the techniques described herein relate to a vehicle lamp system, wherein the light source is a first light source mounted to a printed circuit board, wherein the vehicle lamp is a first vehicle lamp, and further including a second light source mounted to the printed circuit board, the second light source configured to illuminate second vehicle lamp different than the first vehicle lamp.

In some aspects, the techniques described herein relate to a vehicle lamp system, wherein the first vehicle lamp is a side marker lamp, and the second vehicle lamp is a daytime running lamp.

In some aspects, the techniques described herein relate to a vehicle lamp system, wherein the light source is at least one light emitting diode mounted to a printed circuit board of a side marker lamp.

In some aspects, the techniques described herein relate to a vehicle lamp system, wherein the frustum reflector is a white frustum reflector.

In some aspects, the techniques described herein relate to a vehicle lamp system, wherein the frustum reflector redirects light from the light source.

In some aspects, the techniques described herein relate to a vehicle lamp system, wherein the frustum reflector redirects the light from the light source from 80 to 100 degrees.

In some aspects, the techniques described herein relate to a vehicle lamp system, wherein the frustum reflector includes a surface arranged at a 45 degree angle relative to the lens and the light source, the surface redirecting the light from the light source.

In some aspects, the techniques described herein relate to a vehicle lamp system, wherein the lens is a microstructure lens.

In some aspects, the techniques described herein relate to a vehicle lamp system, wherein at least an inboard side of the lens is textured.

In some aspects, the techniques described herein relate to a vehicle lamp system, wherein the frustum reflector is hollow.

In some aspects, the techniques described herein relate to a vehicle lighting method, including: emitting light from a light source into a frustum reflector; redirecting the light within the frustum reflector; and illuminating a vehicle lamp using the light redirected within the frustum reflector.

In some aspects, the techniques described herein relate to a vehicle lighting method, wherein the vehicle lamp is a side marker lamp.

In some aspects, the techniques described herein relate to a vehicle lighting method, wherein the light source is a first light source mounted to a printed circuit board, wherein the vehicle lamp is a first vehicle lamp, and further including a second light source mounted to the printed circuit board, the second light source configured to illuminate second vehicle lamp different than the first vehicle lamp.

In some aspects, the techniques described herein relate to a vehicle lighting method, wherein the first vehicle lamp is a side marker lamp, and the second vehicle lamp is a daytime running lamp.

In some aspects, the techniques described herein relate to a vehicle lighting method, wherein the frustum reflector redirects the light from the light source from 80 to 100 degrees.

In some aspects, the techniques described herein relate to a vehicle lighting method, further including illuminating a lens of a daytime running lamp using light emitted from the light source.

In some aspects, the techniques described herein relate to a vehicle lighting method, wherein the illuminating includes illuminating a lens of a side marker lamp, the lens having an inboard side that is textured.

In some aspects, the techniques described herein relate to a vehicle lighting method, wherein the frustum reflector is hollow.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates generally to a lamp system that incorporates a hollow frustum reflector and, in particular, to system for guiding light to a lens of a side marker lamp using the hollow frustum reflector. Packaging a light source for a side marker lamp can present challenges as side marker lamps are often located in irregular or contoured surfaces of the vehicle.

Figure 1:
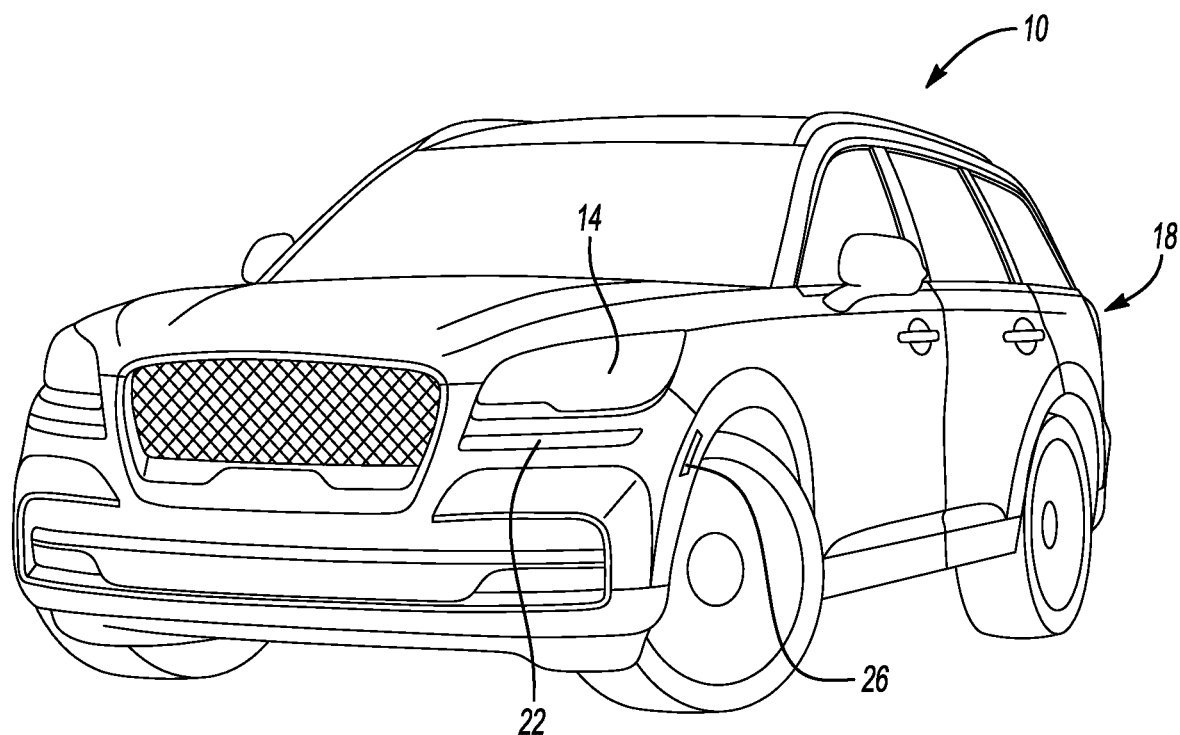
FIG. 1 illustrates a perspective view of vehicle incorporating a lamp system.

With reference to FIG. 1, a vehicle 10 can include various lamp assemblies including head lamps 14, taillamps 18, daytime running lamps 22, and side marker lamps 26. Each of the lamp assemblies can be illuminated by activating a light source, such as at least one light emitting diode (LED).

Figure 2:
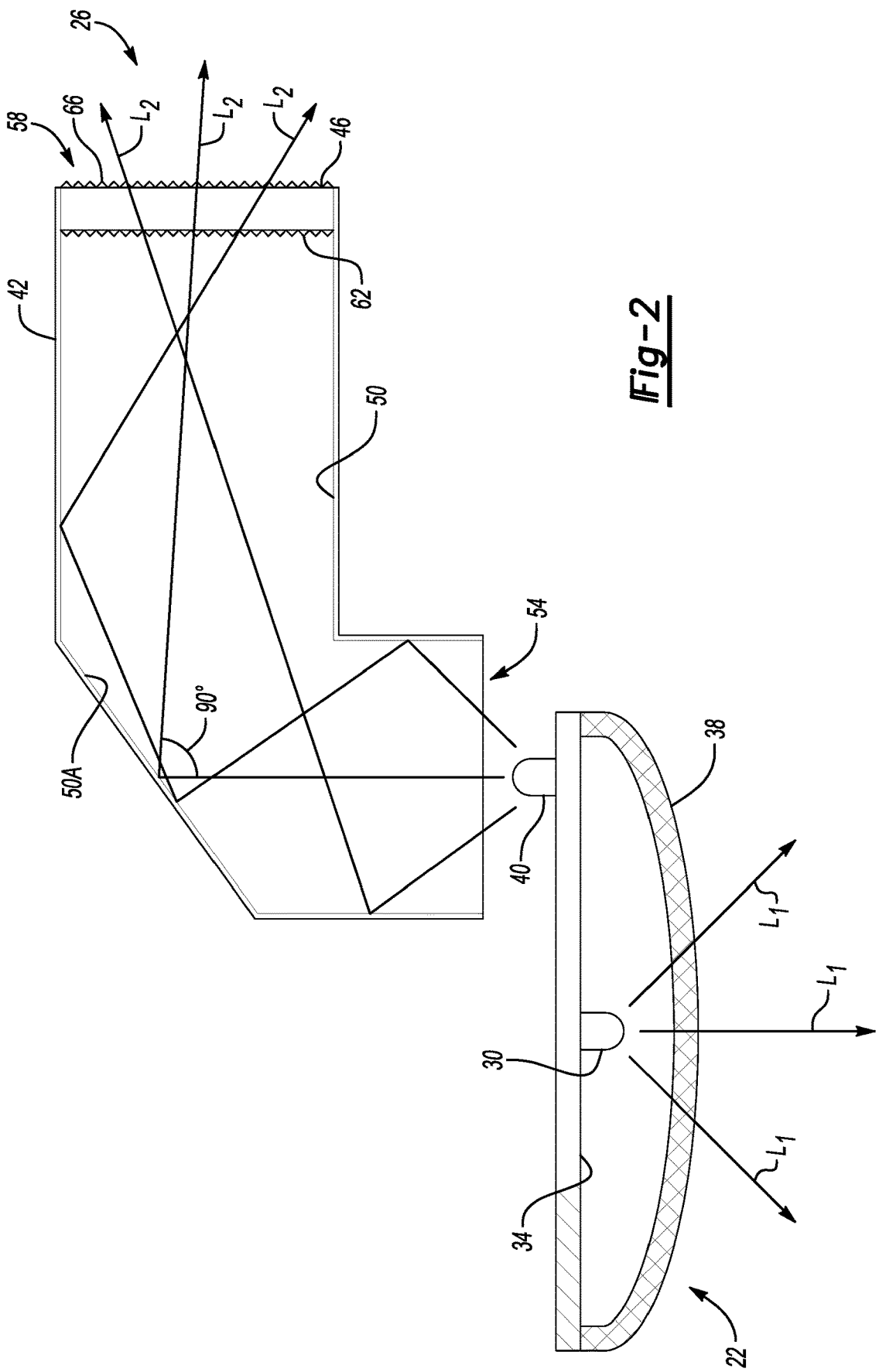
FIG. 2 illustrates a schematic view of a lamp system from the vehicle of FIG. 1 according to an exemplary embodiment of the present disclosure.

With reference now to FIG. 2 and continuing reference to FIG. 1, the daytime running lamp 22 on a driver side of the vehicle 10 is illuminated with at least one first LED 30 mounted to a printed circuit board 34. Light $L_1$ from the first LED 30 passes from the first LED 30 through a lens 38 of the daytime running lamp 22. The first LED 30 emits light when activated. A person having skill in this art and the benefit of this disclosure could understand how to active an LED to emit light.

At least one second LED 40 is mounted to the printed circuit board 34 of the daytime running lamp 22. The side marker lamp 26 is illuminated by the second LED 40. Because the second LED 40 is mounted to the printed circuit board 34 of the daytime running lamp 22, an additional printed circuit board and LED devoted exclusively to illuminating the side marker lamp 26 is not required. This can, among other things, reduce complexity.

In this example, the daytime running lamp 22 is illuminated by the first LED 30 mounted to the printed circuit board 34 and the side marker lamp 26 is illuminated by the second LED 40 mounted to the printed circuit board 34. In another example, the same LED or LEDs could illuminate both the daytime running lamp 22 and the side marker lamp 26. That is, the same LED or LEDs could illuminate a lens of a daytime running lamp and a lens of a side marker lamp.

Figure 3:
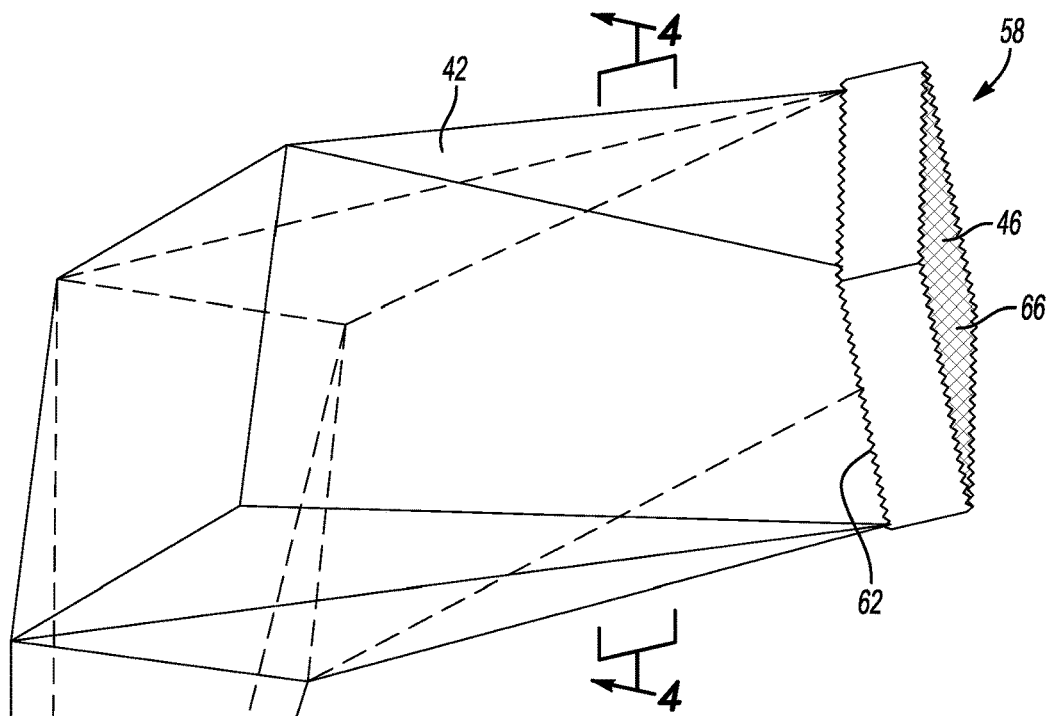
FIG. 3 illustrates a side view of a frustum reflector from the lamp system of FIG. 2.
Figure 4:
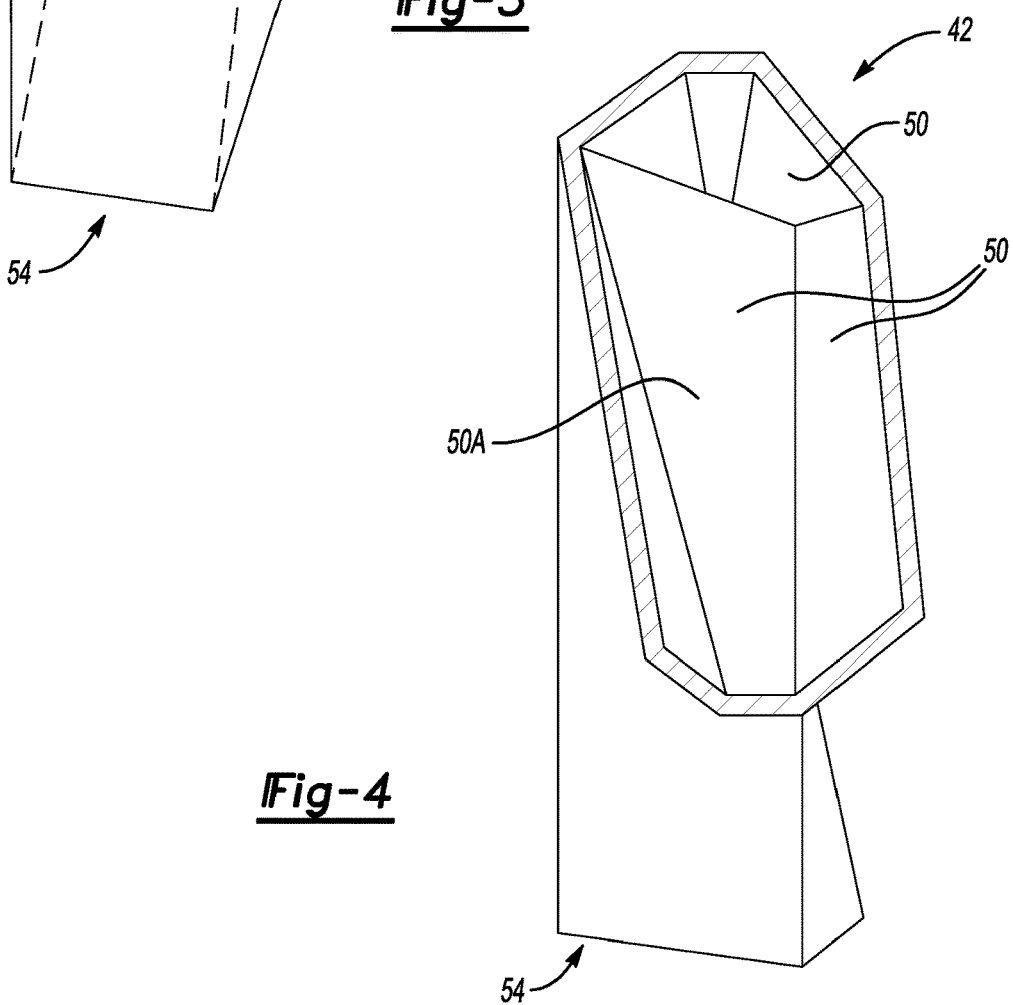
FIG. 4 illustrates a section view taken at line 4-4 in FIG. 3.
Figure 5:
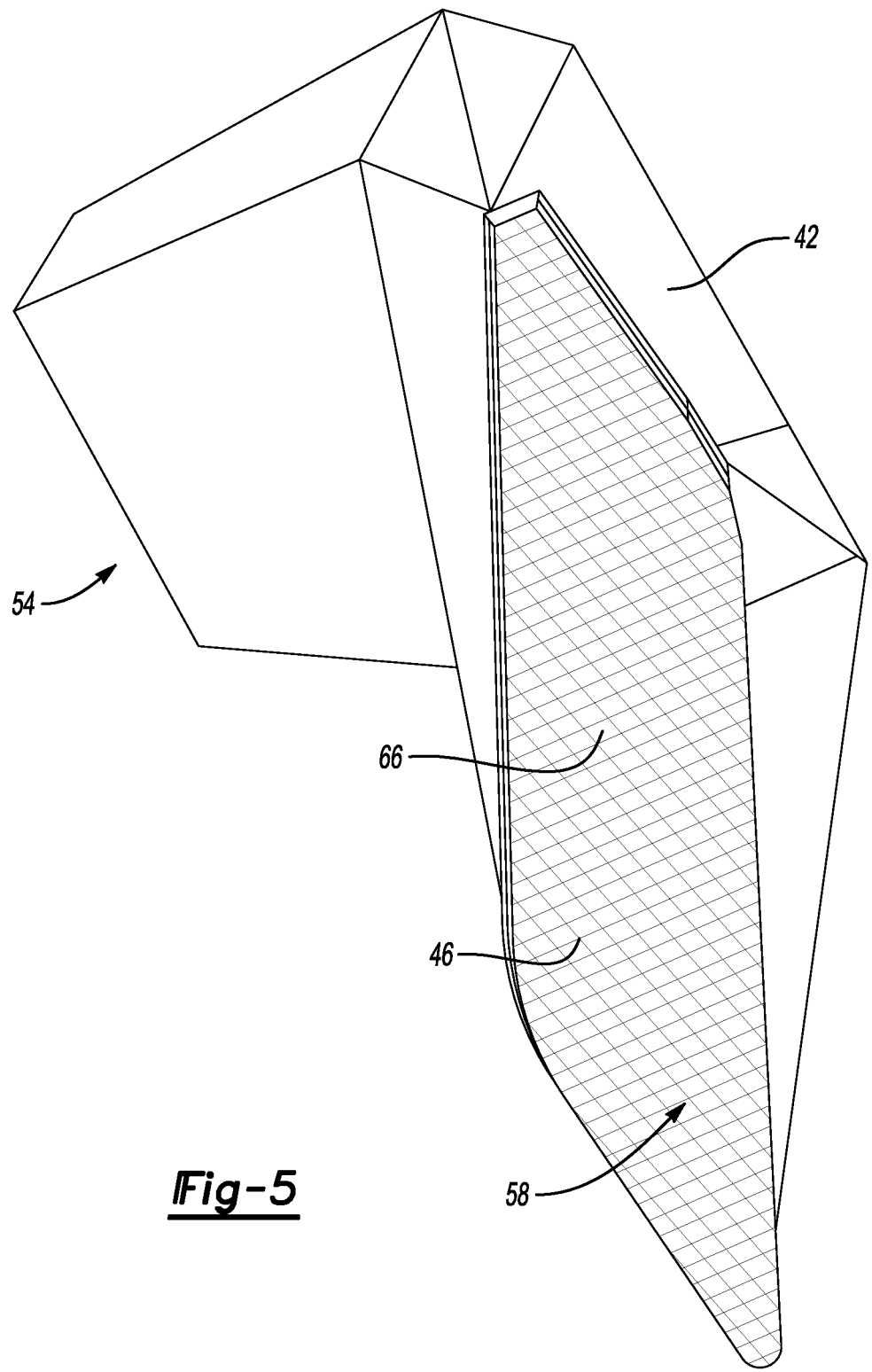
FIG. 5 illustrates another side view of the frustum reflector from the lamp system of FIG. 2.

With reference now to FIGS. 3-5 and continuing reference to FIGS. 1 and 2, a frustum reflector 42 is disposed between the second LED 40 and a lens 46 of the side marker lamp 26. The frustum reflector 42 is, in this example, a polymer-based, hollow structure. The frustum reflector 42 can be a molded polycarbonate material.

The frustum reflector 42 guides light from the second LED 40 to the lens 46 of the side marker lamp 26. The lens 46 can be molded together with the frustum reflector 42 such that the lens 46 and frustum reflector 42 are a single structure. Alternatively, the lens 46 can be separate from the frustum reflector 42.

Inner surfaces 50 of the example frustum reflector 42 are white to promote reflection of light within the frustum reflector 42. The frustum reflector 42 could be painted white, molded from a white material, or both. In some example, the inner surfaces 50 could be covered with a highly reflective film.

An end 54 of the frustum reflector 42 opens to the second LED 40. An opposite end 58 of the frustum reflector 42 opens to the lens 46 of the side marker lamp 26. To illuminate the lens 46 of the side marker lamp 26, the second LED 40 is activated to emit light $L_2$ into the end 54 of the frustum reflector 42. The second LED 40 is shown as substantially centered relative to the first end 84, but could be offset.

The frustum reflector 42 guides the light $L_2$ toward the lens 46. The light $L_2$ is then emitted through the lens 46 to illuminate the side marker lamp 26. Guiding the light through the frustum reflector 42 can facilitate an even distribution of light when viewing the lens 46. An inboard side 62 of the lens 46 can be textured to further help blend and distribute light passing through the lens 46. An outboard side 66, or class-A side of the lens 46 can also be textured.

Texturing surfaces of the lens can facilitate evenly spreading light. In an embodiment, the texturing can be molded into the lens 46. The texturing can include fluted areas that are pillow shaped. The curved surfaces of the fluted areas can spread light to different angles. The fluted or curved areas can be made very small such that the lens 46 can be considered a microstructure lens.

The lens 38 of the daytime running lamp 22 faces forward. The lens 46 is outboard the second LED 40. The lens 46 faces in an outboard direction. The frustum reflector 42 is configured to redirect light from the second LED 40 outboard to the lens 46 of the side marker lamp 26.

The example frustum reflector 42 includes an inner surface 50A that is arranged at a 45 degree angle relative to the lens 46 and the second LED 40. Generally, the light $L_2$ from the second LED 40 is travelling rearward relative to a direction of the vehicle 10 when entering the frustum reflector 42. This light $L_2$ can be redirected by the inner surface 50A from 80 to 100 degrees so that the light $L_2$ is directed horizontally outboard to the lens 46.

The inner surfaces 50 of the frustum reflector 42 other than the inner surface 50A can help to reflect, collimate, and direct the light $L_2$ toward the lens 46. The frustum reflector 42 can help to expand and spread the light $L_2$ fifteen degrees in some examples. The example frustum reflector 42 can change a Lambert distribution of the light to a relatively collimated and controlled light.

Features of the disclosed examples include incorporating a frustum reflector into a lamp assembly to guide light from a light source through a lens of a side marker lamp. Thus, a light source devoted solely to illuminated the side marker lamp may not be required. The frustum reflector can help to uniformly distribute light to the entire lens of the side marker lamp. In some examples, a 2.80 to 1 or less contrast ratio can be achieved with the frustum reflector, and not light pipe or light blade is required.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle lamp system, comprising:
   a light source that emits light;
   a lens of a vehicle lamp; and
   a frustum reflector that guides light from the light source to the lens of the vehicle lamp, wherein the vehicle lamp is a side marker lamp such that the lens is a side marker lamp lens.

2. The vehicle lamp system of claim 1, wherein the light source is at least one light emitting diode mounted to a printed circuit board of a side marker lamp.

3. The vehicle lamp system of claim 1, wherein the frustum reflector is a white frustum reflector.

4. The vehicle lamp system of claim 1, wherein the frustum reflector redirects light from the light source.

5. The vehicle lamp system of claim 4, wherein light emitted from light source moves in a direction D into the frustum reflector, and the frustum reflector redirects the light 80 to 100 degrees from the direction D when the light passes to the lens.

6. The vehicle lamp system of claim 4, wherein the frustum reflector includes a surface arranged at a 45 degree angle relative to the lens and the light source, the surface redirecting the light from the light source.

7. The vehicle lamp system of claim 1, wherein the lens is a microstructure lens.

8. The vehicle lamp system of claim 1, wherein at least an inboard side of the lens is textured.

9. The vehicle lamp system of claim 1, wherein the frustum reflector is hollow.

10. A vehicle lamp system, comprising:
 a light source that emits light;
 a lens of a vehicle lamp; and
 a frustum reflector that guides light from the light source to the lens of the vehicle lamp,
 wherein the light source is a first light source mounted to a printed circuit board, wherein the vehicle lamp is a first vehicle lamp, and further comprising a second light source mounted to the printed circuit board, the second light source configured to illuminate second vehicle lamp different than the first vehicle lamp.

11. The vehicle lamp system of claim 10, wherein the first vehicle lamp is a side marker lamp, and the second vehicle lamp is a daytime running lamp.

12. A vehicle lighting method, comprising:
 emitting light from a light source into a frustum reflector;
 redirecting the light within the frustum reflector; and
 illuminating a vehicle lamp using the light redirected within the frustum reflector, the vehicle lamp a side marker lamp.

13. The vehicle lighting method of claim 12, wherein the light source is a first light source mounted to a printed circuit board, wherein the vehicle lamp is a first vehicle lamp, and further comprising a second light source mounted to the printed circuit board, the second light source configured to illuminate second vehicle lamp different than the first vehicle lamp.

14. The vehicle lighting method of claim 13, wherein the first vehicle lamp is a side marker lamp, and the second vehicle lamp is a daytime running lamp.

15. The vehicle lighting method of claim 3, wherein light emitted from the light source moves into the frustum reflector in a direction D1, wherein the frustum reflector redirects the light from the light source in a direction D2 to the vehicle lamp, the direction D2 offset from 80 to 100 degrees from the direction D1.

16. The vehicle lighting method of claim 12, further comprising illuminating a lens of a side marker lamp using light emitted from the light source.

17. The vehicle lighting method of claim 12, wherein the illuminating includes illuminating a lens of a side marker lamp, the lens having an inboard side that is textured.

18. The vehicle lighting method of claim 12, wherein the frustum reflector is hollow.

\* \* \* \* \*

UNITED STATES PATENT AND TRADEMARK OFFICE
CERTIFICATE OF CORRECTION

PATENT NO. : 12,146,633 B1
APPLICATION NO. : 18/521064
DATED : November 19, 2024
INVENTOR(S) : Chen et al.

Page 1 of 1

It is certified that error appears in the above-identified patent and that said Letters Patent is hereby corrected as shown below:

In the Claims

Claim 15, Column 6, Line 17, change "Claim 3" to --Claim 13--.

Signed and Sealed this
Seventeenth Day of December, 2024

Derrick Brent
*Acting Director of the United States Patent and Trademark Office*